Patented Nov. 15, 1938

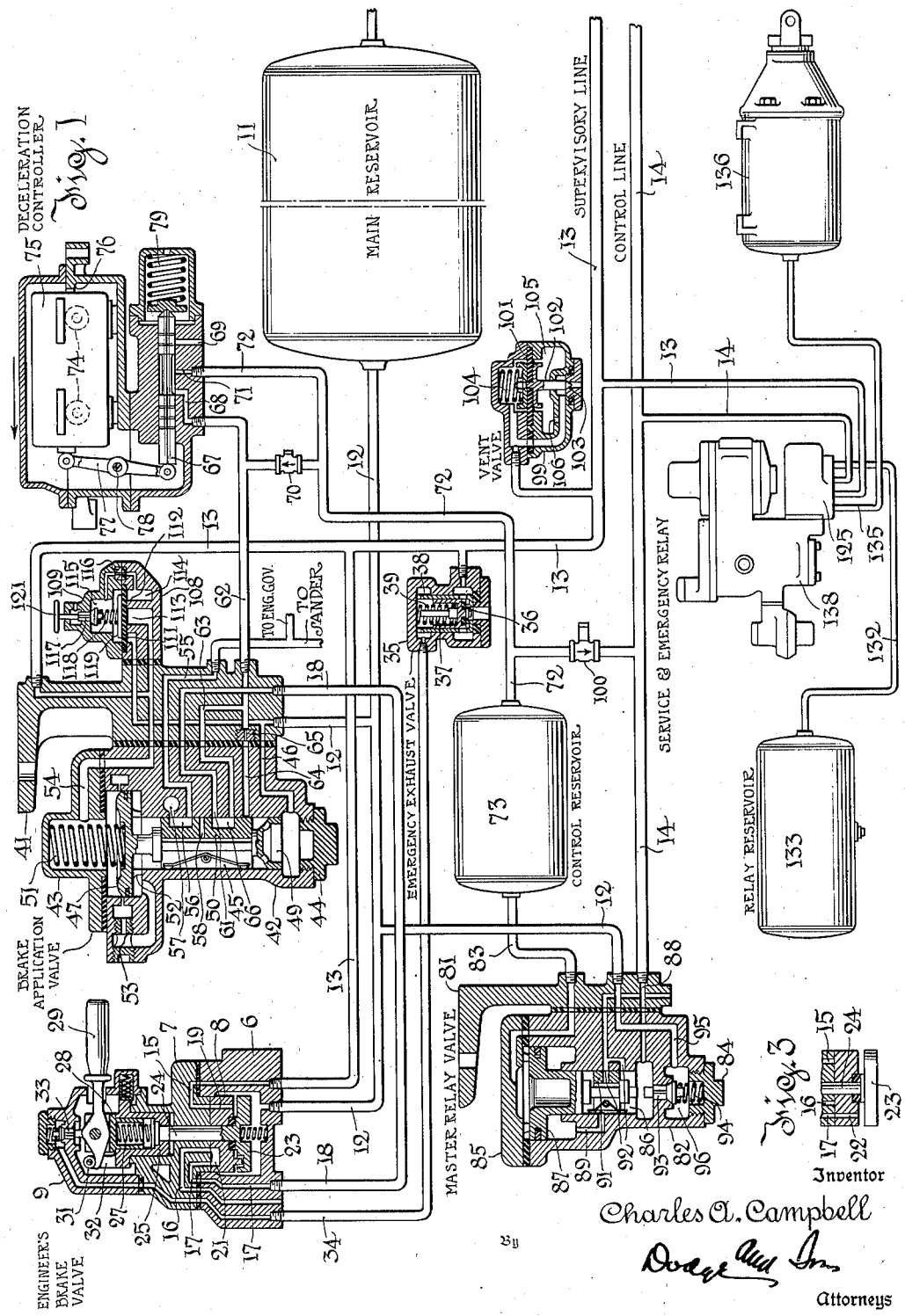

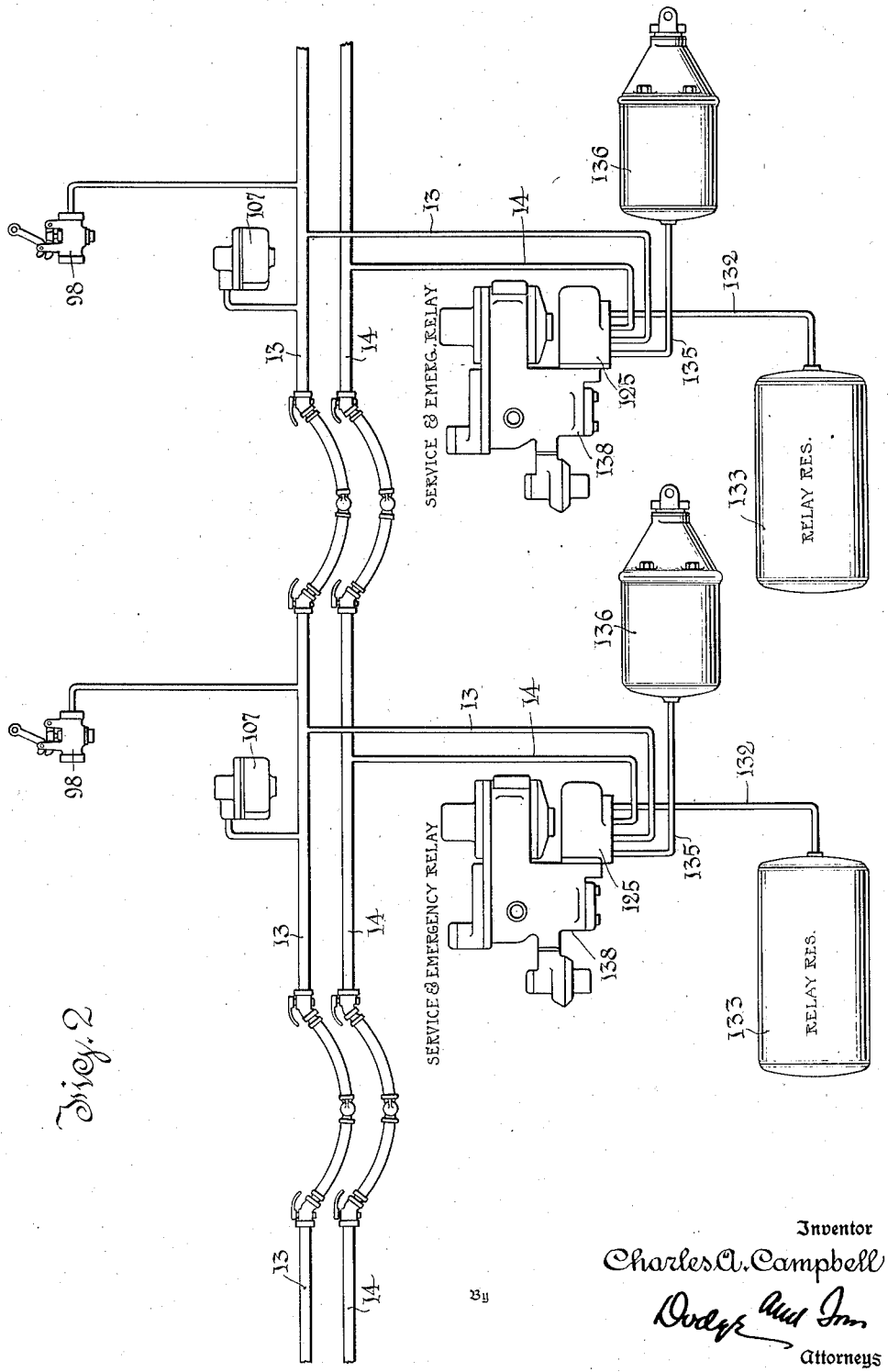

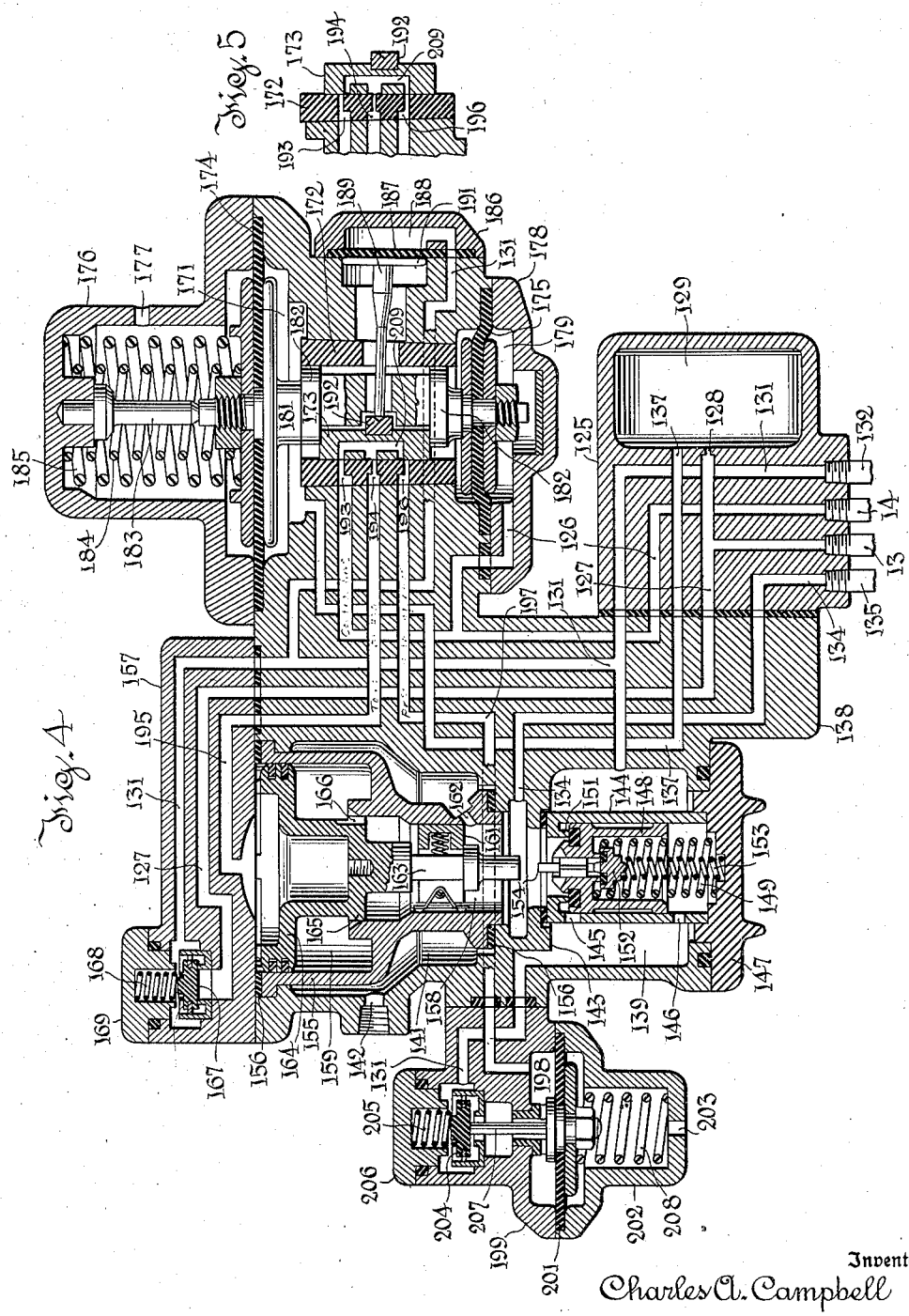

2,136,576

UNITED STATES PATENT OFFICE 2,136,576

FLUID PRESSURE BRAKE

Charles A. Campbell, Watertown, N. Y., assignor to The New York Air Brake Company, a corporation of New Jersey Application May 10, 1934, Serial No. 724,988

47 Claims. (Cl. 303—24)

This invention relates to air brakes, and particularly to straight air brakes of the type using a control line, and a supervisory line, which serves as a reservoir line, in conjunction with relay brake valves responsive to control line pressure and serving to admit and exhaust air to and from corresponding brake cylinders. Relay reservoirs fed through check valves by the supervisory line are used as sources for brake cylinder air.

The invention resides chiefly in mechanism associated with such relay brake valves to control their action so as to ensure brake applications if the supervisory line is ruptured, and permit the production of an application when the control line is ruptured.

The invention involves features of patentable novelty in the relay brake valve mechanism, and also in combinations of such mechanism with a control system intended for high speed trains, and described and claimed in a copending application Serial No. 724,987 filed May 10, 1934. Such system is shown here as a basis for claiming system combinations including the improved relay valve.

The essential elements of the system disclosed in said prior application, comprise an engineer's brake valve for exercising the primary manual control, an associated deadman valve (a safety feature whose use is optional); a brake application valve, which protects the main reservoir charge in the event of rupture of the supervisory line, and in case of rupture or venting of the supervisory line function to initiate a brake application; (optionally) a manually operable by-pass valve for quickly recharging the supervisory line; a deceleration controller for regulating the development of control line pressure in response to the deceleration produced by a brake application; and, preferably, a master relay valve which serves as an intermediary between the above recited elements and the control line, securing rapid changes of control line pressures by the use of devices, all of which, except the master relay, are characterized by small ports, short valve travel, and consequently small size and weight.

With a system such as that just outlined, the present invention contemplates the use of relay brake valves controlling brake cylinder pressure and involving various structural refinements. Such relay valves are each associated with a corresponding change-over valve, and brake cylinder pressure limiting valve. The change-over valve responds to the condition of charge of the supervisory line and the condition of charge of the control line to produce certain important results. First, it ensures an application of the brakes during charging of the system until a safely charged condition is reached, at which time the application may be released through the engineer's brake valve when in release position. Second, it ensures an application of the brakes if the supervisory line is vented by rupture or otherwise and subjects that application to control by the deceleration controller if the control line is intact and the associated mechanism operative, and to control by the pressure limiting valve in case control line pressure be not developed in a definite short period, a condition which may be caused by rupture of the control line, or other derangement of the system. The delay period feature of this second function may be omitted if desired.

Rupture of the control line does not automatically produce an application, but leaves the system in a condition such that an application may be caused by venting the supervisory line. Such venting is conveniently accomplished by permitting the deadman valve to act, and applications produced under the condition stated are controlled by the pressure limiting valve.

The importance of limitation of brake cylinder pressure arises from the high speed at which the trains are operated and the high deceleration rates which are necessary when such trains are controlled by block signal systems in which the blocks are of the present lengths. Normally the deceleration is controlled by the deceleration controller, so as to be as high as possible without danger of sliding wheels. Whenever the deceleration controller is inactive the application must be limited to an intensity such that sliding will not occur at any speed down to the final stop. This is particularly important with articulated trains, because one flat wheel puts an entire train, rather than merely one car, out of use.

A preferred embodiment of the invention is illustrated in the accompanying drawings, in which,—

Fig. 1 is a view partly in elevation and partly in section, showing the equipment on the leading car (or locomotive).

Fig. 2 is a similar view showing the equipment on two trailing cars.

Fig. 3 is a fragmentary view showing the rotary valve of the engineer's brake valve in application position.

Fig. 4 is a sectional view of the service and emergency relay brake valve, including the change-over valve and pressure limiting valve.

Fig. 5 is a fragmentary view showing the change-over valve in its shifted position.

Figs. 1 and 2 combined show the system for a three car train. Figs. 1 and 4 are diagrammatic to the extent that the ports are drawn as if they all lay in a single plane, this being a familiar convention in this art to permit various flows to be traced in a single view.

Referring first to Fig. 1, the engineer's brake valve comprises a pipe bracket portion 6 to which all pipe connections are made, a seat portion 7 on the lower face of which is the inverted seat for the rotary valve 8, and a bonnet or housing 9 which encloses the deadman handle mechanism.

The main reservoir appears at 11 and the main reservoir pipe and all branches thereof in free communication therewith are indicated by the numeral 12.

Similarly the supervisory line with its freely communicating branches are indicated by the numeral 13 and the control line and freely communicating branches by the numeral 14.

The bracket 6 is connected to the main reservoir pipe 12, which supplies main reservoir air to the chamber in which the rotary valve 8 is mounted. Supervisory line 13 is connected to bracket 6 and thence to a port 15 in the seat of rotary valve 8. Also in the seat for rotary valve 8 are an atmospheric exhaust port 16, and a port 17, which may be called the "control port" because it is the port which normally exercises control on the control pipe, through the brake application valve, deceleration controller, and master relay. A pipe 18 connected to bracket 6 communicates with the control port 17.

In release position, shown in Fig. 1, a port 19 through the rotary valve 8, admits main reservoir air to supervisory line port 15 and a cavity 21 connects control port 17 with exhaust port 16.

In lap position ports 15, 16 and 17 are blanked. In service position a through port 22 (see Fig. 3) admits main reservoir air to control port 17, ports 15 and 16 being blanked.

The valve 8 is turned by head 23 on stem 24 which is fast in hub 25. The hub is engaged by the impositive detent which defines the valve positions. Swiveled in hub 25 and urged upward by compression spring 27 is a forked yoke 28. The deadman handle 29 is inserted between the branches of yoke 28 and its inner end engages under lug 31 and between spaced lugs 32 all carried by hub 25, thus locking yoke 28 and hub 25 together, and permitting the handle to operate the valve. The handle must be held down against the urge of spring 27, else it will unseat the poppet vent valve 33 and vent line 34.

The deadman valve above described involves patentably novel features, but as these are inventions independent of the control system here under discussion, they are not claimed in the present application.

The vent line 34 is connected to the body 35 of an emergency exhaust valve connected to vent the supervisory line 13 if valve 33 be unseated. In body 35 is a seat 36 controlling an atmospheric port and a combined piston and valve 37 which coacts with seat 36 and is loosely fitted in bushing 38. A spring 39 urges piston-valve 37 in a closing direction. If valve 33 be closed pipe 34 becomes charged by leakage past the piston during charging of pipe 13 and spring 39 holds the valve closed. Opening of valve 33 vents pipe 34 so that valve 37 opens and vents pipe 13. The consequent venting of the supervisory line causes a brake application, as will be explained.

The brake application valve is carried in a ported bracket 41, to which all pipe connections are made, and comprises a body 42, front cap 43 and plug 44 as the enclosing structure. The body encloses a slide valve chamber 45 with which the reservoir line 12 directly communicates through a port 46. In chamber 45 is a seat for slide valve 50. Communicating with chamber 45 is a cylinder which receives piston 47. The piston 47 has a stem with spaced shoulders which embrace slide valve 50 and cause it to partake of the movements of the piston. A spider 49 guides the piston stem. A coil compression spring 51 reacts between the front cap and the piston, forcing this inward (downward) to a normal position defined by stand-off lugs 52 on the inner side of the piston.

In the normal position so defined, a charging bypass around the piston from chamber 45 to the space within the front cap is afforded through choke fittings 53, interchangeable to permit adjustment of flow capacity. The space within the front cap is connected by way of port 54 with supervisory line 13. Thus under normal conditions line 13 is charged through choke 53 from the main reservoir. This charging connection is cut off, when piston 48 moves outward and seats against the front cap gasket.

A port 55 in the seat of slide valve 50 is indicated by legends to be connected with accessory apparatus such as a sander and an engine governor for the car propelling engine. In normal position of the slide valve port 55 is vented to atmosphere by way of cavity 56 and exhaust port 57, but in the outer position of the slide valve 50 a through port 58 admits main reservoir air to port 55 to operate the sander and change the loading of the engine governor.

Pipe 18 which communicates with control port 17 of the engineer's brake valve leads to a port 61 in the seat of slide valve 50. A pipe 62 leads from two ports 63 and 64 in the seat of slide valve 50. A choke 65 is interposed in port 64. When the slide valve 50 is in the normal position a cavity 66 connects ports 61 and 63 and port 64 is blanked. When the piston moves outward, ports 61 and 63 are disconnected and port 64 is exposed so that main reservoir air flows to pipe 62 at a rate controlled by the size of choke 65.

The pipe 62 leads to the device which responds to deceleration. This comprises a balanced piston valve 67 working in a valve chamber having a port 68 to which pipe 62 is connected, an atmospheric exhaust port 69 and between the two a port 71 connected by pipe 72 with control reservoir 73.

The direction of motion of the train (here assumed to be a single end unit) is indicated by the arrow on Fig. 1, and guided on rollers 74, to move in a line parallel to such motion, is an inertia mass 75 whose normal (rear) position is defined by stop 76. Mass 75 reacts through lever 77, fulcrumed at 78, upon the valve 67 in opposition to an initially stressed coil compression spring 79 at the rear end of the valve.

No means for adjusting the stress on spring 79 is illustrated, but nothing in the present invention would preclude the use of adjusting means known in the art, some of which are covered by copending applications of the present applicant.

Deceleration of the train at rates produced by application of the brakes causes mass 75 to move forward shifting valve 67. The ports 68 and 69 are so spaced relatively to the reduced middle portion of valve 67, that as the valve is shifted from the normal position in which it connects ports 68 and 71 and blanks port 69, it first assumes a position in which it blanks ports 68 and 69, and then on slight further motion, assumes a position in which it connects ports 69 and 71 and blanks port 68. The action of the valve obviously is progressive or graduating, and the lap in ports 68 and 69 is slight, so that the action of the valve is quite refined.

A bypass check valve 70 permits release of the brakes by the engineer's brake valve when valve 67 blanks port 68.

Details of the structure of the deceleration controller involve independent inventions and hence are not claimed in the present application.

Between control reservoir 73 and control pipe 14 a master relay valve of large flow capacity is interposed. A by-pass check valve 100, loaded to open when pressure in the control reservoir 73 is eight pounds per square inch or more above pressure in control line 14, assures an application should the master relay valve be sluggish in action, and also permits an application to be made if the main reservoir supply line to the master relay be ruptured.

A bracket 81 supports the relay valve body 82 and to it are connected the supervisory line 12, the control line 14, and pipe 83 leading from control reservoir 73. The body 82 has a plug closure 84 at its lower end and a cap 85 at its upper end, and encloses a slide valve chamber 86 and a cylinder in which works the relay piston 87. The chamber 86 is in free communication with control pipe 14 by way of port 88, and with the space below piston 87 by restricted port 89, the stem of the piston being enlarged adjacent the piston to fit chamber 86 freely and thus exercise a moderate damping effect on the piston's movements.

The piston actuates an exhaust slide valve 91 of the grid type controlling simultaneously two exhaust ports 92 leading from chamber 86 to atmosphere. The ports 92 are wide open when piston 87 is in its outer (upper) position. As the piston moves inward (downward) valve 91 first closes ports 92, after which the stem engages poppet inlet valve 93 and unseats it against the urge of compression spring 94. This admits main reservoir air by way of main reservoir pipe 12, port 95 and chamber 96 to chamber 86, which, as stated, is connected with the control pipe 14.

A conductor's valve 98 is used on each trailer, or wherever desirable, and when manually opened vents the supervisory line 13 to which it is connected.

To accelerate complete venting, whenever initiated by a conductor's valve 98 or emergency exhaust valve 35, or any other means, a large capacity vent valve, whose body is indicated at 99, is connected to supervisory line 13. Vent valve 99 is located as close to the brake application valve as is practicable, so that its opening will cause piston 47 to respond despite any feeding flow through choke fitting 53. The body 99 is made in two parts between which is clamped a flexible diaphragm 101. The diaphragm actuates a pin valve 102 coacting with seat 103 to control an atmospheric vent port leading from the supervisory line. The diaphragm is urged in a valve closing direction by supervisory line pressure and by a coil compression spring 104. It is subject in the opposite direction to pressure in a chamber 105, charged from the supervisory line through a restricted opening 106. Slow reductions of supervisory line pressure do not affect the diaphragm sufficiently to open the vent valve because of back flow through port 106, but a sudden reduction will cause the vent valve to open wide.

Similar vent valves, permissibly of smaller venting capacity, may be located on the trailers as indicated at 107 and serve to propagate, throughout the length of the supervisory line, an emergency reduction of supervisory line pressure.

To expedite release after an application caused by venting of the supervisory line, a so-called by-pass valve is provided to charge the supervisory line from the main reservoir.

It is preferably located close to piston 47 of the brake application valve and hence is shown mounted on bracket 41. The by-pass valve is made up of a body 108 bolted to bracket 41 and a cap 109 bolted to body 108. Between the cap and body a flexible diaphragm 111 is clamped and serves as a valve in conjunction with the annular seat rib 112 in body 108. When the diaphragm seats on rib 112 it isolates from each other a central chamber 113 connected through a branch of port 54 with the supervisory line, and a surrounding annular chamber 114 connected by a branch of port 46 with main reservoir pipe 12. The chamber 115 within cap 109 and above diaphragm 111 is charged from chamber 114 through choke 116. An atmospheric vent valve 117 is urged closed by pressure in chamber 115 and also by a coil compression spring 118 which reacts between the valve and a thrust plate 119 resting upon diaphragm 111. A push button 121 is provided to permit manual unseating of valve 117.

By striking button 121 the operator opens vent valve 117, venting chamber 115 at a rate greatly in excess of the charging flow through choke 116. Diaphragm 111 lifts, connecting chambers 113 and 114. Piston 47 then shifts and having shifted the resulting feed through choke 53 maintains sufficient pressure above the piston to hold it down.

The mechanism so far described is disclosed and claimed in said prior application. The relay brake valves now about to be described involve patentable novelty individually and also in combination with such mechanism.

On each vehicle or car there is at least one braking unit. Such units being identical, a description of one will suffice for all.

A ported pipe bracket 125 is provided and to this all pipe connections are made. The control line port 126 is connected to the control line 14. The supervisory line port 127 is connected to the supervisory line 13 and has a branch leading through a choke 128 to a timing chamber 129. A relay reservoir port 131 is connected by pipe 132 to relay reservoir 133. A brake cylinder port 134 is connected by pipe 135 to brake cylinder 136. There is also a timing chamber port 137 leading from the timing chamber 129. Under some conditions it is desirable to omit choke 128 and timing chamber 129 and in such case port 137 is connected directly with port 127.

Bolted to bracket 125 is a body 138 which houses the relay and the change-over valve mechanisms. The ports 126, 127, 131, 134 and 137 have similarly numbered extensions in body 138.

One portion of the body 138 is formed with two aligned chambers 139 to which a branch of port 131 leads and 141 which is freely vented to atmosphere at 142. The two chambers are separated by an annular partition 143. A branch of brake cylinder port 134 leads to the space within or opening through partition 143.

Sealed against the lower face of partition 143 by means of a gasket and within chamber 139 is a cylinder bushing 144 having ports 145 and 146 near its opposite ends. The bushing is held in place by a removable cover plate 147 which closes the end of chamber 139. Slidable in bushing 144 is a piston-like poppet valve 148 urged upward by a coil compression spring 149 into sealing engagement with a seat rib 151 at the upper end of bushing 144. A gasket on the end of the valve coacts with the seat.

Mounted in the piston valve 148 and controlling a through port in the end thereof is a pilot valve 152 of the poppet type seated by a coil compression spring 153 lighter than spring 149. Valve 152 also carries a gasket to coact with its seat and its pilot has an extension 154 which extends beyond the upper end of valve 148 to ensure serial opening of valves 152 and 148 in the order stated. The valves 152 and 148 control flow of relay reservoir air from chamber 139 to port 134 and thence to the connected brake cylinder 136. Valve 152 acts as a pilot valve providing for service flow and relieving the seating pressure on valve 148 so that this valve opens without undue resistance if the actuating device moves far enough to unseat it. This occurs in emergency applications, and at such times the lower end of valve 144 blanks port 146.

Mounted in, and spaced from the walls of chamber 141 is a bushing 155, sealed to the body 138 at both ends by gaskets 156. The bushing is held under sealing pressure by a removable cap 157. This bushing forms a slide valve chamber 158 and cylinder 159. In the slide valve chamber is a seat for an exhaust slide valve 161, the valve 161 controlling an exhaust port 162 in the seat. The slide valve is held to its seat by springs, as shown, and is confined, with slight lost motion, between collars on the stem 163 of an actuating piston 164 which works in cylinder 159. The end of stem 163 engages extension 154 of pilot valve 152 after slide valve 161 has closed exhaust port 162 and the lost motion between the stem and slide valve 161 is such as to permit graduation of supply flow, by opening and closing pilot valve 152 while the slide valve 161 remains at rest in closed position.

Between piston 164 and stem 163 is a central hub or enlargement 165 which makes a free fit in the upper end of slide valve chamber 158. A narrow slot 166 in the periphery of hub 165 offers restricted communication between the space below piston 164 and slide valve chamber 158. This protects the piston from most of the blast effect of air admitted by valves 148 and 152, while subjecting the lower side of the piston to brake cylinder pressure.

To protect the charge in relay reservoir 133 in case the supervisory line 13 is vented, a charging check valve is used. This may be variously located, but it is desirable to interpose it between ports 127 and 131. A convenient location is in cap 157 and accordingly a charging check 167 with sealing spring 168 and removable cover cap 169 is shown controlling communication between extensions of ports 127 and 131 in cap 157.

Formed in the body 138 is a change-over valve chamber 171 provided with a slide valve chamber bushing 172 with ported seat for change-over slide valve 173. The upper end of the chamber 171 is closed by a flexible diaphragm 174 and the lower end is closed by a flexible diaphragm 175, the effective area of diaphragm 174 being approximately twice that of diaphragm 175. Diaphragm 174 is clamped in place at its periphery by cap 176 which is vented to atmosphere at 177 so that the outer face of the diaphragm is subject to atmospheric pressure. Diaphragm 175 is clamped at its periphery by cap 178 and chamber 179 within the cap is subject to control line pressure admitted by a branch of port 126.

The diaphragms are connected together by a stem 181 which carries clamping disks as shown, the disks embracing the middle portions of the two diaphragms and being retained by nuts threaded on stem 181 as clearly shown. Stem 181 has spaced collars 182 which embrace the slide valve 173 so that the valve partakes of the longitudinal movements of stem 181. The upper or normal position of the stem 181 (and consequently of valve 173) is defined by a stop pin 183 fixed in cap 176. Two coil compression springs 184 and 185 react between cap 176 and the upper diaphragm-clamping disk and urge stem 181 downward.

A cap 186 clamps a flexible diaphragm 187 at its periphery and encloses a chamber 188 to which a branch of relay reservoir port 131 leads. A thrust pin 189 with bearer disk 191 transfers the inward thrust of diaphragm 187 to a socketed thrust block 192 on the back of slide valve 173. In this way valve 173 is held seated at all times. The parts are so arranged that pin 189 is at 90° to the seat of valve 173 when the valve is in mid-position.

The seat for valve 173 has three ports; port 193 to which control passage 126 leads, a port 194 connected by passage 195 with the space above relay piston 164, and a port 196 connected by passage 197 with chamber 198 in body 199 of the pressure limiting valve.

The lower wall of chamber 198 comprises a flexible diaphragm 201, clamped at its periphery by cap 202, which is vented to atmosphere at 203. A check valve 204, with seating spring 205, retained by cap 206, controls flow from a branch of the relay reservoir passage 131 to chamber 198 and closes in the direction of flow toward said chamber. Clamped to the center of diaphragm 201 by a disk and nut, as shown, is a stem 207 which on upward motion of the diaphragm unseats valve 204. A coil compression spring 208 reacts between cap 202 and the diaphragm-clamping disk to urge stem 207 and diaphragm 201 upward.

The strengths of springs 205 and 208 are so related to the area of diaphragm 201 that valve 204 will close when pressure in chamber 198 reaches a safe upper limit. The valve determines the limiting pressure exerted on the upper side of piston 164 at times when the deceleration controlling device is ineffective, and the limiting pressure is so chosen that the resulting brake application will be insufficient to lock the wheels at any train speed. In a practical commercial embodiment of the invention the limiting pressure was 60 pounds gage, and that value may be chosen for purposes of discussion.

The slide valve 173 is ported as indicated at 209, the port 209 having three branches so arranged that when valve 173 is in its normal (upper) position control port 193 is connected to relay cylinder port 194 and limiting valve port 196 is blanked. In the lower, or change-over position of valve 173, control port 193 is blanked and limiting valve port 196 is connected with relay cylinder port 194 (see Fig. 5).

The relationship of the engineer's brake valve and the deceleration controller to each other and to the supervisory line, either with or without the master relay and control reservoir, forms the subject matter of my prior application above identified, and hence are not broadly claimed herein. These parts, however, and particularly the brake application valve and deceleration controller enter into special coactive relation with the service and emergency relay valves, such coaction being dependent on the response of the changeover portion and being affected, under certain conditions, by the response of the pressure limiting valve.

When the train is running and the brakes are released, the control line 14 is at atmospheric pressure, the engineer's brake valve, brake application valve, deceleration controller, and master relay valve, are in the positions shown in Fig. 1. The parts of the service and emergency relay valve are in the positions shown in Fig. 4. The engineer may make a brake application by shifting the engineer's brake valve to application position (see Fig. 3) in which port 22 admits main reservoir air to port 17, and thence via control pipe 18, through port 61, cavity 66, port 63 and pipe 62 to port 68 of the deceleration controller valve. In the normal position of the deceleration controller, port 68 is connected to port 71 and thence via pipe 72 to control reservoir 73. Consequently, under normal conditions the engineer's brake valve establishes a brake applying pressure in the control reservoir 73 and this pressure operates upon the master relay valve to establish a corresponding pressure in the control pipe 14. With the change-over portion in normal position of Fig. 4, control pipe 14 is connected to the chamber above pistons 164 of the service and emergency relay valves and these function to establish corresponding pressures in the brake cylinders by feeding air from the relay reservoirs to the brake cylinders. The relay reservoirs are automatically replenished from the supervisory line through the reservoir charging checks 167.

As soon as application of the brakes produces a deceleration rate sufficient to cause the weight 75 of the deceleration controller to overpower the spring 79, the deceleration controller valve takes control, blanking the port 68 and establishing a graduated connection between the control reservoir port 71 and the exhaust port 69. Since the intensity of the brake application must be progressively reduced to maintain a uniform deceleration rate, the deceleration controller takes immediate control of the application, graduating the brakes off to maintain a uniform deceleration rate until the train comes to rest, at which time the deceleration controller resumes its normal position and reconnects ports 68 and 71, blanking port 69.

If the supervisory pipe is vented in any way, the piston 47 moves upward against resistance of the spring 51 and disconnects the main reservoir from the supervisory line by cutting off the feeding connection through the choke 53. At the same time port 63 is blanked and main reservoir air is admitted through port 64 and choke 65 to the pipe 62, and consequently to the deceleration controller. The effect is to produce an application in the manner already described. As an incidental function the sander port is disconnected from exhaust 57 and subjected to main reservoir pressure admitted through the port 58. Main reservoir air thus operates the sanders and also flows to the engine governor of the train to perform certain regulatory functions, whose details are not involved in the present invention.

The supervisory line might be vented in various ways, such as rupture of the line, operation of a conductor's valve 98, with attendant operation of the emergency vent valves. Also it might be operated by the deadman action incident to release of the handle 29. This unseats the deadman valve 33 and by venting pipe 34 causes emergency exhaust valve in body 35 to vent the supervisory line to atmosphere.

The functions of the service and emergency relay valve in case of the venting of the supervisory line 13, can now be traced.

Referring to Fig. 4, if the line 13 be vented the charging check valves 167 will close and protect the charges in the relay reservoir 133. The chamber 129 will start discharging through the choke 128 so that the chamber 179 will start to bleed back to the vented supervisory line. The venting of the supervisory line will cause the brake application valve to function, as already described, and establish a brake applying pressure in the control line 14.

The function of the delay chamber 129 and choke 128 is to delay the depletion of pressure in the chamber 171 and consequently to delay the descent of stem 181 under the urge of the springs 184 and 185 long enough to permit pressure in the chamber 179 to build up. Consequently, if the master relay valve functions, as normally it will, and if the control line 14 is intact, pressure will build up in the chamber 179 before pressure in the chamber 171 is depleted, and the changeover valve 173 will remain in the normal position shown in Fig. 4. Consequently, the control line remains connected to the spaces above pistons 164 of the relay valves and the brake application will be subjected to control by the deceleration controller acting through the control reservoir, the master relay and the control line.

But suppose that the master relay fails to function or that the control line 14 is ruptured. In either event pressure will not be established in the chamber 179 and after the delay interval, imposed by the venting of the delay chamber 129 through choke 128, the springs 184 and 185 will force stem 181 downward, shifting the changeover valve 173 to the position shown in Fig. 5. In this position the control line port 173 is blanked and the change-over port 196 is connected to port 194 and thence to the spaces above the pistons 164 of the service and emergency relay valves. The pressure limiting valve 204 being normally open, air from the relay reservoir will flow from chamber 139 past valve 204 through passage 197 and port 196, cavity 211, port 194 and passage 195 to piston 164, and thus establish the brake applying pressure on the relay valve piston. This pressure, however, is limited in amount because when it reaches the chosen value, here assumed to be 60 pounds, the diaphragm 201 will move down against the resistance of spring 208 and close the valve 204. In this way the intensity of the brake application is limited to the value determined by the setting of the pressure limiting valve 204, here assumed to be sixty pounds. This limitation of pressure is necessary because the deceleration controller cannot control as the result of the interruption of its connection through the master relay and the control line. The pressure limiting valve thus holds the application to an intensity which will prevent locking of the wheels by the brakes.

From the above it follows that the venting of the supervisory line alone will automatically produce an application and this application will be controlled by the deceleration controller if the control line and master relay perform their normal functions. If, however, the control line is ruptured, or the master relay should fail to function, there will still be an application but that application will be limited to a maximum intensity which is maintained throughout the stop without danger of sliding the wheels. If the control line alone be ruptured, an application will not be automatically produced, but it can be produced at any time by venting the supervisory line. A convenient way of performing this function is to release the handle 28 and vent the supervisory line through the operation of the deadman mechanism. An application so produced is limited to sixty pounds by the pressure limiting valve.

It has been suggested that the delay chamber 129 and choke 128 can be omitted, in which case the ports 127 and 137 are in free communication with each other. In such case rupture of the supervisory line 13 will immediately vent the chamber 171, causing immedate descent of the stem 181 and immediate shifting of the valve 173. It is desirable so to relate the area of the diaphragm 175 to the aggregate strength of the springs 184 and 185 that when chamber 171 is at atmospheric pressure the valve 173 will be shifted to its upper position and to its lower position, respectively, as pressure in the chamber 179 rises above and falls below the setting of the pressure limiting valve 204, here assumed to be 60 pounds. This is particularly important when the delay chamber 129 and choke 128 are omitted.

If the supervisory line 13, and consequently the chamber 171, are vented when control line 14, and consequently the chamber 179, are at atmospheric pressure, the valve 173 will shift to its lower position, causing the pressure limiting valve 204 to establish a definite pressure (assumed to be 60 pounds) on the piston 164. This would produce a 60 pound brake application which will continue indefinitely unless control line pressure rises above 60 pounds.

If the control line is intact, and if the master relay functions, venting of the supervisory line 13 will cause the brake application valve to shift and admit main reservoir air to the control line through the deceleration controller. As a result of this, control line pressure and the pressure in chamber 179 will quickly rise to a value higher than the setting of the pressure limiting valve (60 pounds), and as the pressure in chamber 179 passes above 60 pounds, the valve 173 will shift and connect the control line to the space above piston 164. Consequently brake cylinder pressure rises until the desired deceleration rate is established, whereupon the deceleration controller starts to reduce control line pressure, and consequently brake cylinder pressure, to maintain a uniform deceleration rate as the train slows up. The action of the deceleration controller reduces the pressure in chamber 179 in consonance with the reduction in brake cylinder pressure and when the sixty pound value is reached, the valve 173 again shifts to the position of Fig. 5 and a sixty pound brake cylinder pressure is maintained under the control of the pressure limiting valve. Since the valve 173 shifts at or substantially at the controlling pressure established by the pressure limiting valve, the transition of control from the pressure limiting valve to the deceleration controller and then back to the pressure limiting valve, occurs smoothly and without abrupt changes of brake cylinder pressure.

It should be observed that this action takes place when the supervisory line is completely vented, and will also take place if the supervisory line pressure is depleted sufficiently to cause the change-over valve to shift. Consequently, protection is had, not merely against rupture of the supervisory line, but also against failure of the compressor or the compressor governor such as would reduce supervisory line pressure below a safe value. Whenever pressure in the supervisory line is maintained the stem 181 and consequently the valve 173, are maintained in their upper normal position of Fig. 4 throughout the stop.

The change-over portion and the pressure limiting valve also exercise an important control during charging of the system for they prevent the engineer from moving his train until the system is adequately charged. At the commencement of charging the springs 184, 185 will hold the stem 181 in its lower position so that valve 173 is in the position of Fig. 5. Air will flow to the relay reservoir 133 and this pressure flowing from chamber 139 through the pressure limiting valve 204 and slide valve 173, will establish a brake applying pressure on the piston 164. This will produce a brake application whose intensity increases as the degree of charge increases. This condition will continue even though the engineer's brake valve be in brake-releasing position, until the system is charged to a point at which the supervisory line, and consequently the chamber 171, are charged to a degree at which the pressure in chamber 171, through its action on the differential diaphragm 174, 175, overpowers the springs 184 and 185. When and only when this condition is attained, the valve 173 will be shifted to the normal position of Fig. 4, opening the control line port 193, and placing the engineer's brake valve in control of the system. This insures that if the system is partially charged below a certain critical value, the brake application will continue irrespective of the engineer's brake valve. Thus the engineer can not release his brakes under conditions of partial charge of the system unless this charge exceeds a safe minimum value.

It is obvious that this last-named action takes place irrespective of the presence or absence of the delay chamber 129 and choke 128.

What is claimed is,—

1. In a fluid pressure brake system, the combination of a normally charged supervisory line; a local reservoir charged therefrom; means preventing back flow from the reservoir to the supervisory line; a normally vented control line; means for supplying pressure fluid to the control line to develop pressure therein; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; and means responsive to the rate of deceleration produced by a brake application for cutting off the supply of pressure fluid to the control line and for thereafter venting pressure fluid therefrom to limit the deceleration rate.

2. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; and means responsive to control line pressure and serving above a definite control line pressure to restore the last-named valve means and reestablish communication between the control line and abutment irrespective of the depletion of supervisory line pressure.

3. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; means responsive to control line pressure and serving above a definite control line pressure to restore the last-named valve means and reestablish communication between the control line and abutment irrespective of the depletion of supervisory line pressure; and means responsive to the rate of deceleration produced by a brake application for modulating the pressure in the control line.

4. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; means responsive to the depletion of supervisory line pressure for establishing pressure in the control line; and means responsive to control line pressure and serving above a definite control line pressure to restore communication between the control line and said abutment.

5. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting communication between said control line and the abutment of said relay valve and for subjecting said abutment to pressure fluid; means responsive to the depletion of supervisory line pressure for establishing pressure in the control line; means responsive to control line pressure and serving above a definite control line pressure to restore communication between the control line and said abutment; and means responsive to the rate of deceleration produced by a brake application for modulating the pressure in the control line.

6. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting communication between said control line and the abutment of said relay valve and for subjecting said abutment to pressure fluid; pressure limiting means for limiting the pressure thus developed upon the abutment of the relay; means responsive to depletion of supervisory line pressure for developing a pressure in the control line; and means responsive to the establishment of a definite pressure in the control line for restoring communication between the control line and the relay abutment.

7. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting communication between said control line and the abutment of said relay valve and for subjecting said abutment to pressure fluid; pressure limiting means for limiting the pressure so developed upon the abutment of the relay; means responsive to depletion of supervisory line pressure for developing a pressure in the control line; means responsive to the rate of deceleration produced by a brake application for modulating the pressure in the control line; and means responsive to the establishment of a definite pressure in the control line for restoring communication between the control line and the relay abutment.

8. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; pressure limiting means for limiting the pressure so developed upon the abutment of the relay; means responsive to depletion of supervisory line pressure for developing a pressure in the control line; manually operable means for developing a pressure in the control line; means responsive to the rate of deceleration produced by brake application for modulating pressure in the control line; and means responsive to the establishment of a definite pressure in the control line for restoring communication between the control line and the relay abutment.

9. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; pressure limiting means for limiting the pressure so developed upon the abutment of the relay; means responsive to depletion of supervisory line pressure for developing pressure in the control line; and means responsive to the development of control line pressure to a value equal to the pressure limitation imposed by said pressure limiting means to restore communication between said control line and the abutment of said relay.

10. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting the communication between said control line and the abutment of said relay valve and for subjecting said abutment to pressure fluid; pressure limiting means for limiting the pressure so developed upon the abutment of the relay; means responsive to depletion of supervisory line pressure for developing a pressure in the control line; means responsive to the rate of deceleration produced by a brake application for modulating the pressure in the control line; and means responsive to the development of control line pressure to a value equal to the pressure limitation imposed by said pressure limiting means and serving to restore communication between said control line and the relay abutment.

11. In a fluid pressure brake system, the combination of a normally charged supervisory line; a brake cylinder; a control line; a relay valve normally responsive to control line pressure and functioning alternatively to deliver air derived from the supervisory line to the brake cylinder and to exhaust the brake cylinder; means responsive to reduction of supervisory line pressure and serving to actuate said relay valve to produce a brake application; pressure limiting means for limiting the intensity of an application so produced; and means responsive to control line pressure when supervisory line pressure is so reduced for subjecting said relay valve selectively to control by said pressure limiting means or by pressure in said control line.

12. In a fluid pressure brake system, the combination of a normally charged supervisory line; a brake cylinder; a control line; a relay valve normally responsive to control line pressure and functioning alternatively to deliver air derived from the supervisory line to the brake cylinder and to exhaust the brake cylinder; means responsive to reduction of supervisory line pressure and serving to actuate said relay valve to produce a brake application; pressure limiting means for limiting the intensity of an application so produced; means responsive to control line pressure when supervisory line pressure is so reduced for subjecting said relay valve selectively to control by said pressure limiting means or by pressure in said control line; and means responsive to the rate of deceleration produced by a brake application and serving to modulate control line pressure.

13. In a fluid pressure brake system, the combination of a relay valve; a control line and a supervisory line associated therewith, said supervisory line being normally charged and serving to supply pressure fluid under control of the relay valve, and said control line normally controlling the operation of the relay valve; means responsive to venting of the supervisory line for isolating said relay valve from said control line and causing the relay valve to apply the brakes; and means responsive to development of pressure in the control line for reestablishing the controlling communication thereof with the relay valve.

14. In a fluid pressure brake system, the combination of a relay valve comprising admission and exhaust valve means arranged to control a brake application and a movable abutment connected to actuate said valve means; a control line to whose pressure said abutment is normally subject; a normally charged supervisory line; a local reservoir fed thereby and arranged to supply pressure fluid to said relay valve for brake applications; means responsive to venting of the supervisory line to isolate said abutment from said control line and connect it with said reservoir; pressure limiting means for limiting the pressure developed on said abutment by flow from said reservoir; and means responsive to control line pressure and serving when control line pressure attains the value established by said limiting means, to isolate said abutment from said reservoir and place it in communication with said control line.

15. In a fluid pressure brake system, the combination of a relay valve comprising admission and exhaust valve means arranged to control a brake application, and a movable abutment connected to actuate said valve means; a control line to whose pressure said abutment is normally subject; a normally charged supervisory line; a local reservoir fed thereby and arranged to supply pressure fluid to said relay valve for brake applications; means responsive to venting of the supervisory line to isolate said abutment from said control line and connect it with said reservoir; pressure limiting means for limiting the pressure developed on said abutment by flow from said reservoir; means responsive to control line pressure and serving when control line pressure attains the value established by said limiting means, to isolate said abutment from said reservoir and place it in communication with said control line; and means responsive to the rate of deceleration produced by a brake application and serving to modulate control line pressure.

16. In a fluid pressure brake system, the combination of a relay valve comprising admission and exhaust valve means arranged to control a brake application, and a movable abutment connected to actuate said valve means; a control line to whose pressure said abutment is normally subject; a normally charged supervisory line; a local reservoir fed thereby and arranged to supply pressure fluid to said relay valve for brake applications; means responsive to venting of the supervisory line to isolate said abutment from said control line and connect it with said reservoir; pressure limiting means for limiting the pressure developed on said abutment by flow from said reservoir; means responsive to control line pressure and serving when control line pressure attains the value established by said limiting means, to isolate said abutment from said reservoir and place it in communication with said control line; means responsive to the rate of deceleration produced by a brake application and serving to modulate control line pressure; automatic means for venting said supervisory line; and manually operable means for supplying pressure fluid to said control line under the control of the means responsive to the deceleration rate.

17. In a fluid pressure brake system, the combination of a normally charged supervisory line; a normally vented control line; means responsive to depletion of supervisory line pressure for developing pressure in the control line; a reservoir charged from the supervisory line; means for preventing back flow from said reservoir to the supervisory line; a brake cylinder; a relay comprising a pressure actuated abutment and valve means actuated thereby to establish a related pressure in said brake cylinder; a change-over valve, shiftable between a normal position in which it subjects said abutment to control line pressure, and an abnormal position in which it admits pressure fluid against said abutment; pressure limiting means serving to limit the pressure so developed on said abutment; means biasing said change-over valve toward said abnormal position; means responsive to supervisory line pressure and serving when said pressure is above a critical value to hold said change-over valve in normal position; and means responsive to the development of a definite pressure in the control line when supervisory line pressure is below said critical value, for holding said change-over valve in said normal position.

18. In a fluid pressure brake system, the combination of a normally charged supervisory line; a normally vented control line; means responsive to depletion of supervisory line pressure for developing pressure in the control line; a reservoir charged from the supervisory line; means for preventing back flow from said reservoir to the supervisory line; a brake cylinder; a relay comprising a pressure actuated abutment and valve means actuated thereby to establish a related pressure in said brake cylinder; a change-over valve, shiftable between a normal position in which it subjects said abutment to control line pressure, and an abnormal position in which it admits pressure fluid against said abutment; pressure limiting means serving to limit the pressure so developed; means biasing said change-over valve toward said abnormal position; means responsive to supervisory line pressure and serving when said pressure is above a critical value to hold said change-over valve in normal position; timing means for delaying motion of said change-over valve when the supervisory line is vented; and means responsive to the development of a definite pressure in the control line when supervisory line pressure is below said critical value, for holding said change-over valve in said normal position.

19. In a fluid pressure brake system, the combination of a normally charged supervisory line; a normally vented control line; means responsive to depletion of supervisory line pressure for developing pressure in the control line; a reservoir charged from the supervisory line; means for preventing back flow from said reservoir to the supervisory line; a brake cylinder; a relay comprising a pressure actuated abutment and valve means actuated thereby to establish a related pressure in said brake cylinder; a change-over valve, shiftable between a normal position in which it subjects said abutment to control line pressure, and an abnormal position in which it admits pressure fluid against said abutment; means biasing said change-over valve toward said abnormal position; means responsive to supervisory line pressure and serving when said pressure is above a chosen value to hold said change-over valve in normal position; and means responsive to the development of a definite pressure in the control line when supervisory line pressure is below said chosen value, for holding said change-over valve in said normal position.

20. In a fluid pressure brake system, the combination of a normally charged supervisory line; a normally vented control line; means responsive to depletion of supervisory line pressure for developing pressure in the control line; a reservoir charged from the supervisory line; means for preventing back flow from said reservoir to the supervisory line; a brake cylinder; a relay comprising a pressure actuated abutment and valve means actuated thereby to establish a related pressure in said brake cylinder; a change-over valve, shiftable between a normal position in which it subjects said abutment to control line pressure, and an abnormal position in which it admits pressure fluid against said abutment; means biasing said change-over valve toward said abnormal position; means responsive to supervisory line pressure and serving when said pressure is above a chosen value to hold said change-over valve in normal position; timing means for delaying motion of said change-over valve when the supervisory line is vented; and means responsive to the development of a definite pressure in the control line when supervisory line pressure is below said chosen value, for holding said change-over valve in said normal position.

21. In a fluid pressure brake system, the combination of a normally charged supervisory line; a normally vented control line; means responsive to depletion of supervisory line pressure for developing pressure in the control line; a reservoir charged from the supervisory line; means for preventing back flow from said reservoir to the supervisory line; a brake cylinder; a relay comprising a pressure actuated abutment and valve means actuated thereby to establish a related pressure in said brake cylinder; a change-over valve, shiftable between a normal position in which it subjects said abutment to control line pressure, and an abnormal position in which it admits pressure fluid against said abutment; pressure limiting means serving to limit the pressure so developed; means biasing said change-over valve toward said abnormal position; means responsive to supervisory line pressure and serving when said pressure is above a chosen value to hold said change-over valve in normal position; and means responsive to pressure in the control line and serving when said pressure attains a value equal to the pressure established by said pressure limiting valve to ensure that the change-over valve is held in normal position independently of the action of supervisory line pressure.

22. The combination of a normally vented control line; a normally charged supervisory line; a reservoir connected with the supervisory line; means preventing back flow from said reservoir to the supervisory line; a brake cylinder; a relay valve having an actuating abutment and admission and exhaust valve means actuated thereby to control brake cylinder pressure; and means responsive to the state of charge of the system, and serving when the latter is below a critical value, to admit pressure fluid from the reservoir against said abutment to cause a brake application.

23. The combination of claim 22, in which the means responsive to the state of charge comprises connected differential diaphragms subject in relatively opposite directions to supervisory line pressure, one of said diaphragms being also subject to control line pressure acting in opposition to supervisory line pressure, and biasing means acting on said diaphragms.

24. The combination of claim 22, in which the means responsive to the state of charge comprises connected differential diaphragms both subject in relatively opposite directions to supervisory line pressure, the smaller of said diaphragms being subject to control line pressure acting in opposition to supervisory line pressure, a change-over valve actuated by motion of said diaphragms, and biasing means urging said diaphragms and change-over valve in a direction opposed to the direction of action of control line pressure on the smaller diaphragm.

25. In a fluid pressure brake system, the combination of a relay valve mechanism comprising admission and exhaust valve means for regulating braking pressures, and a movable abutment for actuating the same; a control line normally controlling the pressure on said movable abutment; a normally charged supervisory line; and means responsive to supervisory line pressure and serving when such pressure is below a critical value to isolate said abutment from the control line and subject it to brake applying pressure.

26. In a fluid pressure brake system, the combination of a relay valve mechanism comprising admission and exhaust valve means for regulating braking pressures, and a movable abutment for actuating the same; a control line normally controlling the pressure on said movable abutment; a normally charged supervisory line; means responsive to supervisory line pressure and serving when such pressure is below a critical value to isolate said abutment from the control line and subject it to brake applying pressure; pressure limiting means for limiting such brake applying pressure; and means responsive to control line pressure and serving when control line pressure is above the pressure established by said limiting means to restore the connection between the control line and said abutment irrespective of pressure then existing in the supervisory line.

27. In a fluid pressure brake system, the combination of a relay valve comprising admission and exhaust valve means arranged to control a brake application and a movable abutment connected to actuate said valve means; a control line to whose pressure said abutment is normally subject; a normally charged supervisory line; a local reservoir fed thereby and arranged to supply pressure fluid to said relay valve for brake applications; means responsive to venting of the supervisory line to subject said abutment to a limited pressure; and means effective when the supervisory line is vented and responsive to control line pressure to put the control line into and out of controlling communication with said abutment as control line pressure passes above and below said limited pressure.

28. In a fluid pressure brake system, the combination of a relay valve comprising admission and exhaust valve means arranged to control a brake application and a movable abutment connected to actuate said valve means; a control line to whose pressure said abutment is normally subject; a normally charged supervisory line; a local reservoir fed thereby and arranged to supply pressure fluid to said relay valve for brake applications; means responsive to venting of the supervisory line to subject said abutment to a limited pressure; means effective when the supervisory line is vented and responsive to control line pressure to put the control line into and out of controlling communication with said abutment as control line pressure passes above and below said limited pressure; and means responsive to the rate of deceleration produced by a brake application and serving to modulate control line pressure.

29. In a fluid pressure brake system, the combination of a normally charged supervisory line; a local reservoir charged therefrom; means preventing back flow from the reservoir to the supervisory line; a normally vented control line; a brake cylinder; a relay valve comprising an actuating abutment normally subject to control line pressure and valve means operable thereby to admit pressure fluid from said reservoir to the brake cylinder and to exhaust said brake cylinder to control application of the brakes; means responsive to depletion of supervisory line pressure for developing a pressure in the control line; means responsive to the deceleration produced by a brake application for modulating the pressure in the control line; and means responsive to a reduction of supervisory line pressure below a definite value for interrupting communication between said control line and the abutment of said relay valve and for subjecting said abutment to limited fluid pressure and thereafter responsive to rising control line pressure to place the control line in controlling communication with said abutment.

30. The combination of a normally charged supervisory line; a normally uncharged control line; a local reservoir fed from the supervisory line; a local relay connected with said reservoir, and normally responsive to control line pressure to apply and release the brakes; and valve means responsive to supervisory line pressure and adapted to assume control of said local relay, said valve means being adapted to function in response to reduction and restoration of supervisory line pressure respectively to apply and release the brakes by controlling said relay.

31. In a fluid pressure brake system, the combination of a normally charged supervisory line; a normally charged local reservoir; a normally vented control line; means for supplying pressure fluid to the control line to develop pressure therein; a brake cylinder; a relay valve comprising an actuating abutment normally subject to control line pressure and valve means operable thereby to admit pressure fluid from said reservoir to the brake cylinder and to exhaust said brake cylinder to control the application of the brakes; means responsive to the depletion of supervisory line pressure for interrupting communication between said control line and the abutment of said relay valve and for subjecting said abutment to pressure fluid; and means responsive to the rate of deceleration produced by a brake application for cutting off the supply of pressure fluid to the control line and for thereafter venting pressure fluid therefrom to limit the deceleration rate.

32. In a fluid pressure brake system, the combination of a normally charged supervisory line; a normally charged local reservoir; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; and means responsive to control line pressure and serving above a definite control line pressure to reestablish communication between the control line and the abutment irrespective of the depletion of supervisory line pressure.

33. In a fluid pressure brake system, the combination of a normally charged supervisory line; a normally charged local reservoir; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; means responsive to control line pressure and serving above a definite control line pressure to reestablish communication between the control line and the abutment irrespective of the depletion of supervisory line pressure; and means responsive to the rate of deceleration produced by a brake application for modulating the pressure in the control line.

34. In a fluid pressure brake system, the combination of a normally charged supervisory line; a normally charged local reservoir; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; means responsive to the depletion of supervisory line pressure for establishing pressure in the control line; and means responsive to control line pressure and serving above a definite control line pressure to restore communication between the control line and said abutment.

35. In a fluid pressure brake system, the combination of a normally charged supervisory line; a normally charged local reservoir; a normally vented control line; a brake cylinder; a relay valve comprising an actuating abutment normally subject to control line pressure and valve means operable thereby to admit pressure fluid from said reservoir to the brake cylinder and to exhaust said brake cylinder to control the application of the brakes; valve means responsive to the depletion of supervisory line pressure for interrupting the communication between said control line and the abutment of said relay valve and for subjecting said abutment to pressure fluid; means responsive to the depletion of supervisory line pressure for establishing pressure in the control line; means responsive to control line pressure and serving above a definite control line pressure to restore communication between the control line and said abutment; and means responsive to the rate of deceleration produced by a brake application for modulating the pressure in the control line.

36. In a fluid pressure brake, in combination, a brake cylinder, a relay valve device operated by an increase in fluid pressure for supplying fluid under pressure to the brake cylinder, a straight air pipe, means for supplying fluid under pressure through said straight air pipe to said relay valve device, a brake pipe, an automatic valve device operated upon a reduction in brake pipe pressure for supplying fluid under pressure to said relay valve device, and means associated with said automatic valve device for cutting off communication from the straight air pipe to said relay valve device when pressure in the straight air pipe is lower than the pressure supplied to the relay valve device by said automatic valve device.

37. In a fluid pressure brake, in combination, a brake cylinder, a relay valve device operated by an increase in fluid pressure for supplying fluid under pressure to the brake cylinder, a straight air pipe, means for supplying fluid under pressure through said straight air pipe to said relay valve device, a brake pipe, an automatic valve device operated upon a reduction in brake pipe pressure for supplying fluid under pressure to said relay valve device, and means responsive at least in part to pressure in the straight air pipe, for selectively connecting said pipe and said automatic valve device with said relay valve device.

38. In a fluid pressure brake, in combination, a brake cylinder, a brake pipe, a brake controlling valve device operative upon a reduction in brake pipe pressure for effecting the supply of fluid under pressure to the brake cylinder, a straight air pipe, and means operative upon a predetermined fixed pressure in the straight air pipe for establishing a communication through which the brake cylinder pressure is controlled according to the pressure in the straight air pipe.

39. In a brake equipment for vehicles, in combination, a plurality of braking units each including a brake cylinder, means including a brake pipe a reduction in pressure in which controls the supply of fluid under pressure to said brake cylinders, means including a straight air pipe for controlling the supply of fluid under pressure to said brake cylinders, and means for automatically effecting a transfer in the control of the supply of fluid under pressure to said brake cylinders from one of said control means to the other of said control means after the brakes have been applied.

40. In a brake equipment for vehicles, in combination, a plurality of braking units each including a brake cylinder, means including a brake controlling valve device operative upon a reduction in brake pipe pressure for controlling the supply of fluid under pressure to said brake cylinders, means including a straight air pipe for controlling the supply of fluid under pressure to said brake cylinders, manually operable means for effecting a reduction in brake pipe pressure for causing an application of the brakes and for simultaneously effecting the supply of fluid under pressure to said straight air pipe, and means responsive to a predetermined fixed straight air pipe pressure for transferring the control of brake cylinder pressure from that produced by a reduction in said brake pipe pressure to that produced by an increase in straight air pipe pressure.

41. In a brake equipment for vehicles, in combination, a plurality of braking units each including a brake cylinder, means including a brake pipe for controlling the supply of fluid under pressure to said brake cylinders, means including a straight air pipe for controlling the supply of fluid under pressure to said brake cylinders, one of said control means being adapted to effect a quick application of the brakes, the other of said control means being adapted to effect a uniform application of said several braking units, and means effective after an application of the brakes in response to the operation of the first named means for transferring the control of the brakes to the second named control means.

42. In a fluid pressure brake, in combination, a brake cylinder, a brake pipe, a straight air pipe, a brake controlling valve device operative upon a reduction in brake pipe pressure for controlling the supply of fluid under pressure to the brake cylinder and upon an increase in fluid pressure for establishing a communication through which the brake cylinder pressure is controlled according to the pressure in the straight air pipe, and means operative upon a predetrmined increase in pressure in the straight air pipe for effecting an increase in fluid pressure in said brake controlling valve device.

43. In a brake equipment for vehicles, in combination, a brake cylinder, means including a brake pipe for controlling the supply of fluid under pressure to said brake cylinder, means including a straight air pipe for controlling the supply of fluid under pressure to said brake cylinder, and means responsive to a predetermined fixed straight air pipe pressure and automatically effective upon the application of the brakes in response to a reduction in brake pipe pressure for transferring the control of the brake cylinder pressure to said straight air pipe.

44. In a brake equipment for vehicles, in combination, a plurality of braking units each including a brake cylinder, means including a brake pipe for controlling the supply of fluid under pressure to said brake cylinders, means including a straight air pipe for controlling the supply of fluid under pressure to said brake cylinders, and means automatically effective upon application of the brakes in response to a reduction in brake pipe pressure for transferring the control of the brake cylinder pressure to said straight air pipe.

45. In a brake equipment for vehicles, in combination, a plurality of braking units each including a brake cylinder, means including a brake pipe for controlling the supply of fluid under pressure to said brake cylinders, means including a straight air pipe for controlling the supply of fluid under pressure to said brake cylinders, automatic valve means operative upon a reduction in brake pipe pressure from a running position to an application position for effecting an application of the brakes, and means responsive to a predetermined straight air pipe pressure for returning said automatic valve to its running position for effecting an equalization in pressures within the several brake cylinders by means of the fluid under pressure supplied to the straight air pipe.

46. In a brake equipment for vehicles, in combination, a plurality of braking units each including a brake cylinder, means including a brake pipe for controlling the supply of fluid under pressure to said brake cylinders, means including a straight air pipe for controlling the supply of fluid under pressure to said brake cylinders, manually operable means for effecting a simultaneous reduction in brake pipe pressure and the supply of fluid under pressure to said straight air pipe, automatic valve means movable from a running position to an application position responsive to a reduction in brake pipe pressure for effecting an application of the brakes, and means responsive to a predetermined increase in straight air pipe pressure for returning said automatic valve means to its running position for transferring the control of brake cylinder pressure from that produced by a reduction in brake pipe pressure to that produced by an increase in straight air pipe pressure.

47. In a fluid pressure brake, in combination, a brake cylinder, automatic means for controlling the supply of fluid under pressure to and the release of fluid under pressure from said brake cylinder to effect an application and release of the brakes, means independent of the operation of said automatic means to its application position for controlling the supply of fluid under pressure to and the release of fluid under pressure from said brake cylinder to effect an application and release of the brakes, said first named means being adapted to effect a quick application of the brakes, and said second named means being adapted to effect a quick release of the brakes, and means for effecting a transfer in the control of said brakes from said first named control means to said second named control means after an application of the brakes in response to the operation of said first named control means.

CHARLES A. CAMPBELL.